United States Patent [19]

Quast et al.

[11] 4,144,673

[45] Mar. 20, 1979

[54] SYSTEM AND METHOD FOR INTRODUCING SYSTEMIC TREATMENT LIQUIDS INTO TREES AND SIMILAR PLANTS

[76] Inventors: Danny H. Quast, 8010 N. Range Line Rd.; Dennis R. Fermenich, 5674 N. 37th St.; Herman H. Granof, 2450 W. Good Hope Rd., all of, Milwaukee, Wis. 53209

[21] Appl. No.: 828,311

[22] Filed: Aug. 29, 1977

[51] Int. Cl.² ............................................. A01G 29/00
[52] U.S. Cl. .......................................... 47/57.5; 47/58; 128/213 R; 128/214R; 211/107; 222/105
[58] Field of Search .............. 47/10, 11, 12, 24, 57.5, 47/58; 224/5 R, 5 H, 7 E, 22, 23, 5 B, 5 A; 222/105, 175, 181; 128/114 C, 114 D, 114 F, DIG. 6, 213, 214 R; 21/7, 73; 248/311.3, 339, 340; 211/107, 108

[56] References Cited

U.S. PATENT DOCUMENTS

| | | | |
|---|---|---|---|
| 952,245 | 3/1910 | Gardner | 47/57.5 |
| 1,342,626 | 6/1920 | Frank | 211/107 |
| 1,506,668 | 8/1924 | Rose et al. | 211/107 |
| 1,682,760 | 9/1928 | Laffin | 47/57.5 |
| 1,740,484 | 12/1929 | Von Behr | 21/73 |
| 2,044,063 | 6/1936 | Dahlberg | 47/57.5 |
| 2,954,028 | 9/1960 | Smith | 248/311.3 |
| 3,092,106 | 6/1963 | Butler | 128/214 C |
| 3,915,212 | 10/1975 | Bujan et al. | 128/214 D |
| 3,992,813 | 11/1976 | Freshel | 47/57.5 |

FOREIGN PATENT DOCUMENTS

| | | | |
|---|---|---|---|
| 1314113 | 4/1973 | United Kingdom | 47/57.5 |
| 102163 | 11/1923 | Switzerland | 211/107 |

OTHER PUBLICATIONS

Anon. (1960) "Nancy" (Comic) *The Washington Daily News*, Saturday, 12-31-60, No. 47 p. 31.
Anon. (1958) Bartlett Tree Experts (AD) *House Beautiful* vol. 100, No. 6 p. 223 Jun. 1958.

*Primary Examiner*—Edgar S. Burr
*Assistant Examiner*—James R. Feyrer
*Attorney, Agent, or Firm*—Michael, Best & Friedrich

[57] ABSTRACT

The system for injecting a systemic treatment liquid into trees and similar plants includes a plurality of substantially identical injector nozzles, each of which is insertable into one of a plurality of circumferentially spaced injector holes in the tree, a plurality of substantially identical sealed containers containing the treatment liquid in a predetermined quantity suitable for a single treatment through one of the injector holes and having a discharge conduit which is closed by a frangible member, a flexible strap or belt adapted to be wrapped around the tree at a location above the injector holes, a plurality of substantially identical connecting hose assemblies, each having one end adapted for connection to an injector nozzle and a connector at the other end which is insertable into the container discharge conduit and has a pointed outer tip for puncturing the container membrane, and valve means carried by each of the hose assemblies for selectively opening and closing the flow passage therethrough. The belt has a plurality of holes which are spaced at equal intervals corresponding to the desired circumferential spacing of the injector holes. After the belt is wrapped around the tree at about eye level, the containers are hung by hooks from each of the remaining accessible belt holes and a hose assembly is connected to each container by inserting the connector into the container discharge conduit and the injector nozzles are inserted into the injector holes.

12 Claims, 3 Drawing Figures

SYSTEM AND METHOD FOR INTRODUCING SYSTEMIC TREATMENT LIQUIDS INTO TREES AND SIMILAR PLANTS

BACKGROUND OF THE INVENTION

The invention relates to a system and method for introducing systemic treatment liquids into trees or similar plants and, more particularly, to such a system and method adapted to enable lay persons to treat trees with systemic treatment liquids which normally are dispensed at toxic concentrations and require special handling and/or the services of a licensed arborist.

Various apparatus and methods have been employed for injecting nutritional liquids or liquids effective for combating various diseases, insects, etc., into the vascular system of trees and similar plants. Many commercially available fungicides, insecticides and pesticides are marketed at concentrations which are highly toxic to humans and warm-blooded animals. Consequently, government regulations prohibit their use by the average home owner and frequently require the services of a licensed arborist which often makes the cost of treatment prohibitive to many potential users. The systemic fungicide Lignansan BLP marketed by DuPont and effective for combating the devastating Dutch elm disease is an example of such a treatment liquid.

In addition to this safety problem, most prior art systems for injecting systemic treatment liquids into trees are relatively expensive and/or require the services of a professional arborist to insure that the treatment liquid is properly administered. Such systems typically employ injector assemblies which are inserted into holes drilled circumferentially around the tree.

In one type of prior art system, the injector assemblies are connected to individual pressurized supply containers or are connected to one or more common pressurized supply containers through a manifold arrangement. Examples of systems of this type are disclosed in U.S. Pat. Nos. 1,756,453, 3,254,449, 3,286,401, 3,295,254, 3,834,075 and 3,992,813.

In another type of prior art system, proposed primarily for either fertilizing trees or introducing a coloring agent into trees, the injector assemblies are either individually or collectively connected to an unpressurized container which is suspended from the tree at a location above the injector assembly so that the treatment liquid is introduced into a tree by gravity. Examples of systems of this type are disclosed in U.S. Pat. Nos. 952,245, 1,682,760, 1,740,484, 1,805,550 and 2,044,063. The systems disclosed in these patents, if used in connection with normally toxic treatment liquids, require the user to dilute the liquid to the prescribed concentration for treatment and, consequently, could not be used by lay persons, and further rely on the user's expertise to determine the proper location of the injector holes.

SUMMARY OF THE INVENTION

A principal object of the invention is to provide a simple, reliable treating system and method which can be conveniently and safely used by the average home owner to introduce systemic treatment liquids into trees and similar plants.

Another of the principal objects of the invention is to provide such a system and method which does not require the user to come into direct contact with the treatment liquid and is substantially completely closed after installation.

A further of the principal objects of the invention is to provide such a system which is arranged to facilitate the proper location of the injector holes without the use of special tools and/or knowledge.

Other objects, aspects and advantages of the invention will become apparent to those skilled in the art upon reviewing the following detailed description, the drawing and the appended claims.

The invention provides a system for introducing systemic treatment liquids into a tree or the like including a plurality of substantially identical injector nozzles, each adapted to be inserted into one of a plurality of injector holes in a tree, a plurality of substantially identical sealed containers, each containing the treatment liquid in a predetermined amount suitable for a single treatment through one of the injector holes, a flexible support member adapted to be wrapped around the tree and secured thereto at a location above the desired vertical location of the injector holes, and a plurality of substantially identical, flexible tubular connecting hose assemblies, each having a first or upper end adapted for connection to one of the containers and a second or lower end adapted for connection to one of the injector nozzles. The support member has a plurality of support means, each of which is adapted for suspending one of the containers from the support member.

In one embodiment, the support means are spaced on the support member at predetermined intervals corresponding to the desired circumferential spacing of the injector holes. After the support member has been wrapped around and secured to the tree, a container suspended from each of the support means remaining accessible and the upper end of a hose assembly has been connected to and allowed to hang from each of the suspended containers, the lower ends of the hose assemblies are approximately located at the desired circumferential locations of the injector holes.

In another embodiment, all of the hose assemblies have substantially the same predetermined length which generally corresponds to the desired vertical spacing between the container and the injector nozzles when the support member is located at about eye level such that the lower ends of the hose assemblies also are approximately located at the desired vertical location of the injector holes.

In a further embodiment, the containers include a tubular discharge passage which is normally closed by a frangible member or membrane and the upper end of the hose assembly has a connector which is adapted to fit snugly inside the discharge passage and has a pointed outer tip for puncturing the membrane upon connecting the hose assembly to the container. Valve means preferably is provided on each of the hose assemblies for selectively opening and closing the flow passage therethrough.

In a still further embodiment, the support means includes a plurality of apertures in the support members spaced at the predetermined intervals and a plurality of hooks, each having one end adapted to be hooked into one of the support member apertures and the other end adapted for suspending one of the containers from the support member.

In a preferred method of treatment, the support member or strap is wrapped around the tree at about eye level, a container is suspended by a hook or hanger from the strap at each of the holes remaining accessible, a hose assembly including an injector nozzle is connected to each of the suspended containers and allowed to hang loosely, and injector holes are drilled in the tree at locations generally corresponding to the locations of the lower ends of the hose assemblies. The injector nozzles are then inserted into the injector holes and the valve means on each of the hose assemblies is opened to start gravity flow of the treatment liquid from the container.

DESCRIPTION OF THE PREFERRED EMBODIMENTS

Figure 1:
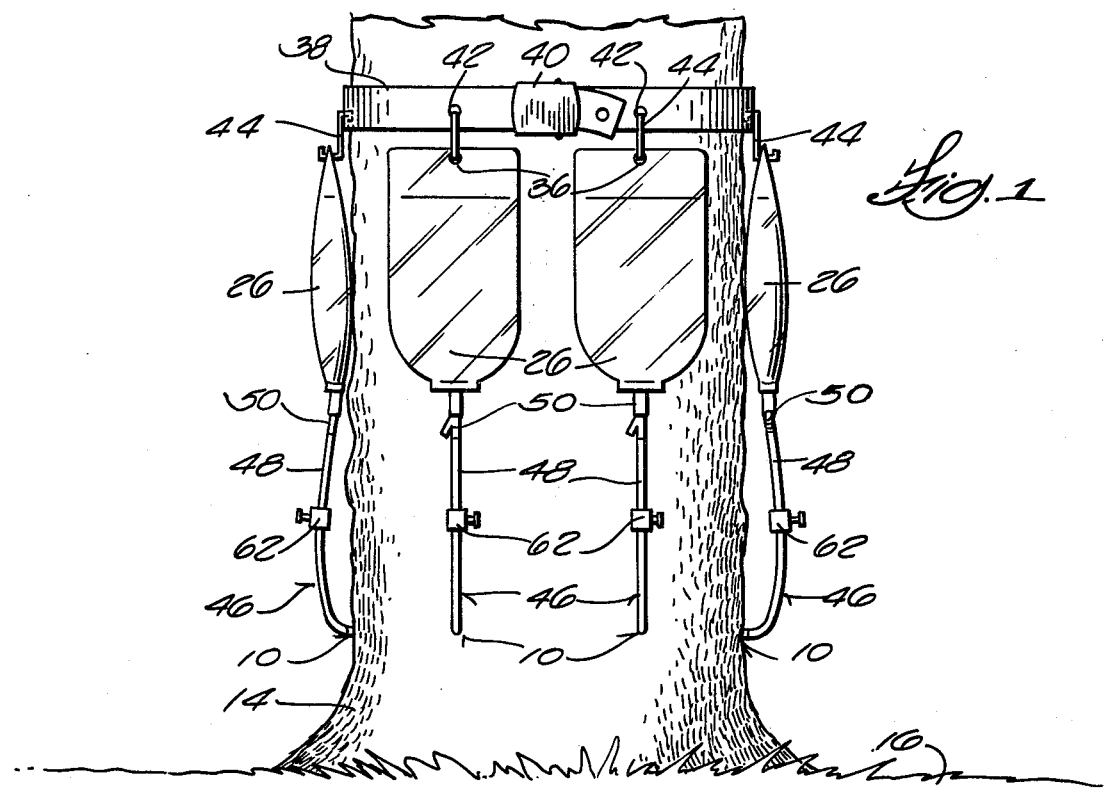
FIG. 1 is a perspective view of a completely assembled treatment system embodying the invention shown installed on a tree ready for introducing a systemic treatment liquid into the tree.

The treatment system and method embodying the invention will be described in connection with injecting a systemic liquid fungicide into the sap stream or vascular system of a tree. However, the invention can be used to introduce a wide variety of systemic treatment solutions containing insecticides, pesticides, nutrients and the like into trees and similar plants. As used herein, the term "systemic treatment liquid" means any solution which is capable of being absorbed into or taken up by the sap stream or vascular system of trees or similar plants and translocated or distributed throughout by the natural circulatory or capillary action.

Referring to the drawings, the treatment system includes a plurality of substantially identical injector nozzles 10, each of which is insertable into one of a plurality of injector holes 12 drilled into a tree 14 at a location near the ground 16 as described in more detail below. The injector holes 12 usually are circumferentially spaced at equal intervals around the tree 14.

Each of the injector nozzles 10 (see FIG. 3) has a tubular body 18 including an outer end portion 20 which has a circular cross section and is inserted into an injector hole 12, a shoulder 22 which serves as a stop for limiting penetration of the injector nozzle 10 into the injector hole 12 and an inner end portion 24. The injector nozzle 10 preferably is made from a suitable synthetic plastic material and the outer end portion 20 tapers slightly towards the outermost end to provide a friction fit with the walls of the injector hole 12. For example, if a 5/32 inch drill is used for drilling the injector holes 12, the outer end portion 20 tapers to a minimum outside diameter of about 5/32 inch.

The treatment system also includes a plurality of substantially identical sealed containers 26 which preferably are in the form of bags and are made from a transparent or translucent synthetic plastic material, such as polyvinyl chloride. Each of the containers 26 contains the prescribed amount of the systemic treatment liquid 26 to be injected into the tree 14 through an injector hole 12 for a single treatment. As a guide, when an elm tree is to be treated for Dutch elm disease with a solution of the fungicide Lignansan BLP, the 0.7% fungicide solution as purchased is first diluted to a concentration of about 0.02% by adding deionized (distilled) water thereto and each container is filled with about 4.2 liters of this diluted solution and then sealed closed in a conventional manner, such as by sealing together the top portions of the side walls with an adhesive or by heat sealing. The size of the containers 26 and the amount and concentration of the treatment liquid 28 introduced into each container will vary depending upon the prescribed dosage for the particular systemic treatment liquid being used.

Located in the bottom portion of each of the containers 26 is an integral discharge conduit 30 which is sealed closed by a frangible member or membrane 32 spaced inwardly from the outlet 34 of the discharge conduit 30. Provided in the upper portion of each of the containers 26 is a hole 36 for hanging the container 26 from the tree 14 as explained below.

While various suitable container designs can be used, commercially available bags used in the medical field for administering interveinous liquids to patients are particularly adaptable for this purpose.

The treatment system further includes a flexible support member which is wrapped around the tree and secured thereto at a location above the desired location of the injector holes 12 and serves as a means for supporting the containers 26. While various arrangements can be used, in the specific embodiment illustrated, the support member is a nylon strap or belt 38 having a conventional snap type clasp or buckle 40. The belt 38 has a plurality of holes 42 which are spaced at equal intervals generally corresponding to the desired circumferential spacing of the injector holes 12 for the particular treatment liquid to be used. For example, when Lignansan BLP is being used, the belt holes 42 are spaced approximately 6 inches apart which corresponds to the recommended circumferential spacing of the injector holes 12 for this particular fungicide. The belt 38 preferably is made long enough to accommodate trees having a circumference of several feet and the buckle 40 permits the belt length to be adjusted as required for trees having smaller circumferences.

The treatment system further includes a plurality of generally S-shaped hooks 44 made from a suitable material such as a synthetic plastic material or metal. One end of each hook 44 fits into a belt hole 42 and the other end fits into a container hole 36 to support the containers 26 from the belt 38 as shown in FIG. 1.

The treatment system further includes a plurality of substantially identical connecting hose assemblies 46 including a length of flexible tubing 48 which is preferably made from a transparent or translucent synthetic plastic material. The tubing 48 for all the hose assemblies 46 preferably is substantially the same predetermined length generally corresponding to the desired vertical spacing between the containers 26 and the injector holes 12. As a guide, the tubing 48 is about 24 inches long for systems used to inject the fungicide Lignansan BLP.

Figure 2:
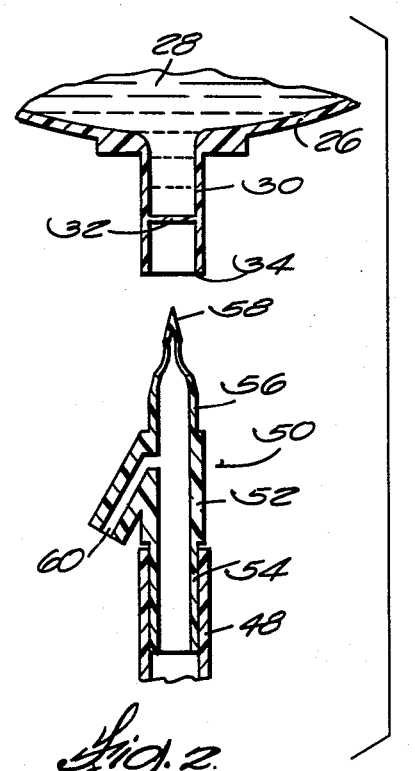
FIG. 2 is an enlarged, fragmentary, section view of a supply container and a hose assembly of the treatment system shown in FIG. 1, illustrating these components prior to connection.
Figure 3:
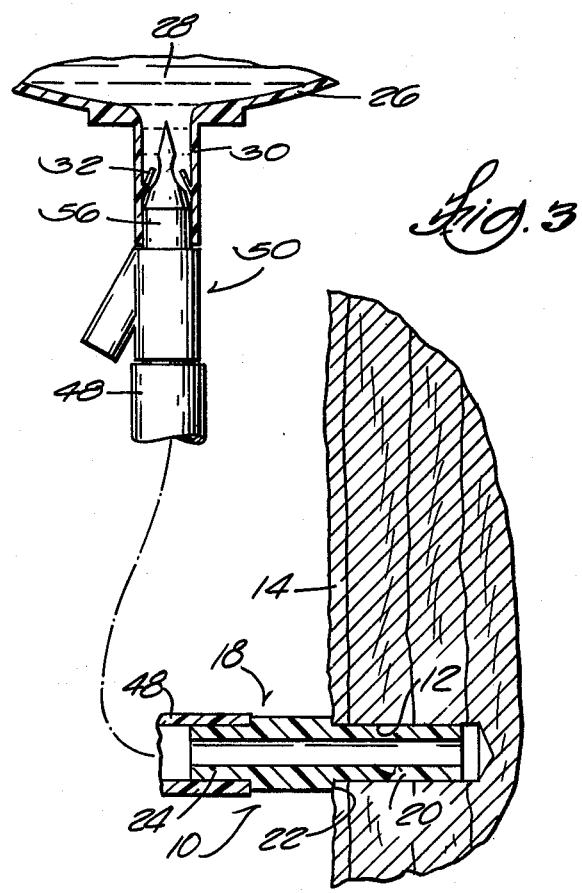
FIG. 3 is an enlarged, fragmentary, partially sectioned view of a supply container, a hose assembly and an injector nozzle of the treatment system shown in FIG. 1, illustrating these components after assembly and installation on a tree.

One end of the tubing 48 fits snugly over the inner end portion 24 of an injector nozzle 10 as best shown in FIG. 3. Provided at the other end of the tubing 48 is a connector 50 having a hollow or tubular body 52 including an inner end portion 54 which fits snugly into the other end of the tubing 48 as best shown in FIG. 2 and an outer end portion 56 which fits snugly into a container discharge conduit 30 and has a pointed tip 58. As the outer end portion 56 of the connector 50 is inserted into the container discharge conduit 30, the pointed tip 58 punctures the membrane 32 and forms a discharge opening therein as shown in FIG. 3.

The connector 50 preferably is provided with a vent passage or port 60 which is open to atmosphere and communicates with the interior of the container 26 after the connector 50 has been inserted into the container discharge conduit 30 to puncture the membrane 32. Thus, the vent port 60 provides a passage for venting the interior of the container 26 to atmosphere, thereby insuring a constant gravity flow of the treatment liquid 28 from the container 26 during treatment.

Carried on each of the hose assemblies 46 is a hose clamp 62 which serves as a valve means for selectively opening and closing the flow passage through the tubing 48.

In a preferred method for treating a tree, the belt 38 is first wrapped around the tree at about eye level and the unbuckled end is then slipped through the buckle 40 and tightened. If desired, small nails, tacks, or the like (not shown) can be driven through the belt 38 into the tree 14 to more positively secure the belt 38 on the tree. A hook 44 is then hooked into each of the remaining accessible belt holes 42 and a container 26 is suspended from each of the hooks 44. A hose assembly 46 is then connected to each of the suspended containers 26, after the hose clamp 62 has been tightened to the closed position, by inserting the outer end portion 56 of the connector 50 into the container discharge conduit 30 to puncture the membrane 32.

After the hose assembly 46 has been connected to the container 26, the hose clamp 62 is loosened to allow a few drops of the treatment liquid 28 to drip out through the injector nozzle 10 as a check to insure there is proper flow from the container 26. After this check, the hose clamp 62 is tightened to the closed position and the hose assembly 46 is allowed to hang loosely from the container 26. The lower end of the tubing 48 indicates the proper circumferential and vertical location of the respective injector hole 12.

An injector hole 12 is then drilled into the tree for each of the injector nozzles 10. The injector holes 12 preferably are drilled horizontally into the tree to at least the depth of the xylem or functional sapwood layers. The ultimate depth of the injector holes 12 must be sufficient to accommodate the outer end portion 20 of the injector nozzle 10. It is desirable to keep the depth and diameter of the injector holes 12 as small as possible in order to minimize wounding of the tree. As a guide, it has been found that the outer end portion 20 of the injector nozzle 10 can be about ⅜ inch long and have an outside diameter of about 5/32 inch.

The injector nozzle 10 is pushed into an injection hole 12 until the shoulder 22 is snug against the tree and the hose clamp 62 is loosened to start gravity flow of the treatment liquid 28 from the containers 26. When the containers 26 have emptied, all the components are removed from the tree and the containers 26 are discarded. The remaining components can be reused if desired, in which case the user needs only to purchase replacement containers containing the treatment liquid to be used.

From the above description, it can be seen that the treatment system and method provided by the present invention provides several important advantages. First, the treatment system employs simply constructed components which can be made from relatively inexpensive materials, thereby permitting the overall cost to be minimized. Second, the treatment liquid is prepackaged in sealed containers in the prescribed amount and concentration for treatment, thereby eliminating the necessity for the user to mix and handle normally toxic liquids with the attendant safety hazards and calibration problems. Third, after installation on a tree, the treatment system is completely closed, except for the vent ports, thereby eliminating, or at least minimizing, entrance of contaminants and possible exposure of the treatment liquid to children and pets. Fourth, the installed treatment system is substantially tamper proof to children. Fifth, the procedure involved in installing and using the treatment system is simple enough so that the average home owner can treat trees without any special training or tools, thereby eliminating the substantial expense for the services of a licensed arborist.

Thus, it is contemplated that a treatment system of the invention employing various normally toxic treatment liquids can be sold in kit form to home owners and other unskilled lay persons through various convenient retail outlets in full compliance with existing government regulations. For different types of treatment liquids and trees in different size ranges, there can be provided separate kits containing the appropriate number and size containers, injector nozzles and hose assemblies and a belt having holes located at intervals generally corresponding to the desired circumferential spacing of the injector holes for the particular treatment liquid. For a subsequent treatment, any containers left over from a previous treatment, if any, can be used and a sufficient number of replacement containers necessary for the particular size tree can be purchased without purchasing an entire kit.

We claim:

1. A system for uniformly introducing systemic treatment liquids into trees or similar plants comprising
   a plurality of substantially identical tubular injector nozzles, each adapted to be inserted into one of a plurality of injector holes located in a tree at uniform circumferential intervals and through which the treatment liquid can be introduced into the tree,
   a plurality of substantially identical, sealed containers, each containing a prescribed amount of the treatment liquid at the prescribed concentration for a single treatment through one of the injector holes,
   a plurality of substantially identical, flexible, tubular connecting base assmelbies, each having a first end adapted for connection to and opening of one of said containers and a second end adapted for connection to one of said injector nozzles, and
   a flexible support member adapted to be wrapped around the tree and secured thereto at a location above the desired vertical location of the injector holes, said support member including a plurality of support means each of which is adapted for suspending one of said containers from said support member, said support means being spaced on said support member at uniform intervals corresponding to the prescribed circumferential spacing for the injector holes.

2. A system according to claim 1 including valve means carried by each of said hose assemblies for selectively opening and closing the flow passage therethrough.

3. A system according to claim 1 wherein
   said hose assemblies have substantially the same predetermined length which generally corresponds to the desired vertical spacing between said containers and the injector holes, such that, after said support member has been wrapped around and secured to the tree, a said container has been suspended from each of said support means remaining accessible, and a said hose assembly has been connected to and allowed to hang straight down from each of said suspended containers, said second ends of said hose assemblies are approximately located at the desired vertical and circumferential locations for the injector holes.

4. A system according to claim 1 wherein
each of said containers includes a tubular discharge passage communicating with the interior of said container and normally closed by a frangible member, and
said first end of each of said hose assemblies includes a tubular connector means adapted to fit snugly inside said container discharge passage and having a pointed outer tip for puncturing a discharge opening through said frangible member as said connector means is inserted into said container discharge passage.

5. A system according to claim 4 wherein
each of said connector means includes a vent port open to atmosphere for venting said container to atmosphere after said connector means has been inserted into said container discharge passage and said frangible member has been punctured.

6. A system according to claim 1 wherein said support means includes
a plurality of apertures in said support member spaced at said predetermined intervals, and
a plurality of hook means, each having one end adapted to be hooked into one of said support member apertures and the other end adapted for suspending one of said containers therefrom.

7. A system according to claim 1 wherein
said injector nozzle includes means defining a stop for limiting the penetration of said injector nozzle into an injector hole.

8. A system for introducing a systemic treatment liquid into a tree comprising
a plurality of substantially identical tubular injector nozzles, each adapted to be inserted into one of a plurality of injector holes in a tree and through which the treatment liquid can be introduced into the tree,
a plurality of substantially identical sealed containers, each containing the treatment liquid in a predetermined quantity suitable for a single treatment through one of the injector holes and having a tubular discharge passage which communicates with the interior of said container and is normally closed by a frangible member,
a flexible strap adapted to be wrapped around the tree and secured thereto, said strap having a plurality of apertures spaced at predetermined intervals generally corresponding to the desired circumferential spacing of the injector holes,
a plurality of hook means, each having one end adapted to be hooked into one of said strap apertures and the other end adapted for suspending one of said containers therefrom,
a plurality of substantially identical, flexible, tubular hose assemblies, each having a first end including a tubular connector means adapted to fit snugly inside a said container discharge passage and having a pointed tip for puncturing a discharge opening through said frangible member as said connector means is inserted into said container discharge passage and further including a second end adapted for connection to a said injector nozzle, said hose assemblies having substantially the same predetermined length which generally corresponds to the desired vertical spacing between said containers and the injector holes when said strap is located on the tree at about eye level, such that, after said strap has been wrapped around and secured to the tree at about eye level, a said container has been suspended by a said hook means from each of said strap apertures remaining accessible and a said hose assembly has been connected to each of said suspended containers by inserting said connector means thereof into a said container discharge passage, said second ends of said hose assemblies are approximately located at the desired circumferential spacing and vertical locations for the injector holes.

9. A system according to claim 8 including valve means carried by each of said hose assemblies for selectively opening and closing the flow passage therethrough.

10. A system according to claim 9 wherein each of said connector means includes a vent port open to atmosphere for venting said container to atmosphere after said connector means has been inserted into said container discharge passage and said frangible member has been punctured.

11. A system according to claim 10 wherein said injector nozzle includes means defining a stop for limiting the penetration of said injector nozzle into an injector hole.

12. A method for introducing a systemic treatment liquid into a tree comprising the steps of
providing a plurality of substantially identical tubular injector nozzles, each adapted to be inserted into one of a plurality of injector holes in the tree and through which the treatment liquid can be introduced into the tree,
providing a plurality of substantially identical sealed containers, each containing the treatment liquid in a predetermined quantity suitable for a single treatment through one of the injector holes and having a tubular discharge passage communicating with the interior of said container and normally closed by a frangible member,
providing a flexible strap adapted to be wrapped around and secured to the tree and having a plurality of apertures spaced at predetermined intervals generally corresponding to the desired circumferential spacing of the injector holes,
providing a plurality of hook means, each having one end adapted to be hooked into one of said strap apertures and the other end adapted for suspending one of said containers therefrom,
providing a plurality of substantially identical, flexible, tubular connecting hose assemblies having substantially the same predetermined length which generally corresponds to the desired vertical spacing between said containers and the injector holes when said strap is located at about eye level, each of said hose assemblies including a first end adapted to fit snugly inside a said container discharge passage and having a pointed outer end portion for puncturing a discharge opening through said frangible member as said first end is inserted into said container discharge passage and further including a second end adapted for connection to a said injector nozzle, providing a valve means on each of said hose assemblies for selectively opening and closing the flow passage therethrough, wrapping said strap around the tree and securing said strap thereto at about eye level, placing a said hook means in each of said strap apertures remaining accessible, suspending a said container from each of said hook means, connecting said first end of a said hose assembly to each of said suspended containers with said valve means closed and said second end connected to a said injector nozzle, drilling injector holes in the tree for receiving said injector nozzles at locations generally corresponding to the locations of said second ends of said hose assemblies when said hose assemblies are allowed to hang loosely from said containers, inserting a respective one of said injector nozzles into each of the injector holes, and opening said valve means on each of said hose assemblies.

* * * * *